United States Patent
Gajdos

(10) Patent No.: US 9,438,714 B2
(45) Date of Patent: Sep. 6, 2016

(54) PHONE CALL AMPLIFICATION ASSEMBLY

(71) Applicant: Richard Gajdos, Olmsted Township, OH (US)

(72) Inventor: Richard Gajdos, Olmsted Township, OH (US)

(*) Notice: Subject to any disclaimer, the term of this patent is extended or adjusted under 35 U.S.C. 154(b) by 0 days.

(21) Appl. No.: 14/587,728

(22) Filed: Dec. 31, 2014

(65) Prior Publication Data

US 2016/0191686 A1  Jun. 30, 2016

(51) Int. Cl.
*H04B 1/38* (2015.01)
*H04M 1/60* (2006.01)
*H04M 1/02* (2006.01)
*H04M 1/03* (2006.01)
*H04M 1/00* (2006.01)

(52) U.S. Cl.
CPC ............. *H04M 1/60* (2013.01); *H04M 1/0254* (2013.01); *H04M 1/03* (2013.01)

(58) Field of Classification Search
CPC ... H04M 1/04; H04M 1/6041; H04M 1/6075
USPC ............................ 455/557, 567, 569.1, 569.2
See application file for complete search history.

(56) References Cited

U.S. PATENT DOCUMENTS

| | | | |
|---|---|---|---|
| 5,333,176 A | 7/1994 | Burke et al. | |
| 6,035,221 A | 3/2000 | Snyder et al. | |
| D512,704 S | 12/2005 | Ron | |
| 7,096,047 B2 | 8/2006 | Geren et al. | |
| 7,324,834 B2 | 1/2008 | Yamaguchi et al. | |
| 8,032,188 B1 | 10/2011 | Walker, Jr. | |
| 8,467,829 B2 * | 6/2013 | Fadell | G06F 1/1632 455/556.1 |
| 2001/0024966 A1 | 9/2001 | Miller et al. | |
| 2013/0219098 A1 * | 8/2013 | Turnpenny | H04M 1/04 710/303 |
| 2013/0324167 A1 | 12/2013 | Bevil | |

FOREIGN PATENT DOCUMENTS

WO    WO0119060    3/2001

* cited by examiner

*Primary Examiner* — Lee Nguyen

(57) ABSTRACT

A phone call amplification assembly includes a cellular phone with a sound emitter to emit a sound when the cellular phone receives a phone call. A housing has a perimeter wall that has a well extending therein. The well has a size to receive the cellular phone. An amplifier is mounted in the housing. A microphone is mounted in the housing and is electrically coupled to the amplifier. A speaker is mounted in the housing and is electrically coupled to the amplifier. The microphone captures audible sounds such that the audible sounds are amplified and emitted by the speaker.

4 Claims, 4 Drawing Sheets

PHONE CALL AMPLIFICATION ASSEMBLY

BACKGROUND OF THE DISCLOSURE

Field of the Disclosure

The disclosure relates to phone call hearing assisting devices and more particularly pertains to a new phone call hearing assisting device for magnifying the sound emitted by a cellular phone.

SUMMARY OF THE DISCLOSURE

An embodiment of the disclosure meets the needs presented above by generally comprising a cellular phone including a sound emitter to emit a sound when the cellular phone receives a phone call. A housing has a perimeter wall that has a well extending therein. The well has a size to receive the cellular phone. An amplifier is mounted in the housing. A microphone is mounted in the housing and is electrically coupled to the amplifier. A speaker is mounted in the housing and is electrically coupled to the amplifier. The microphone captures audible sounds such that the audible sounds are amplified and emitted by the speaker.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
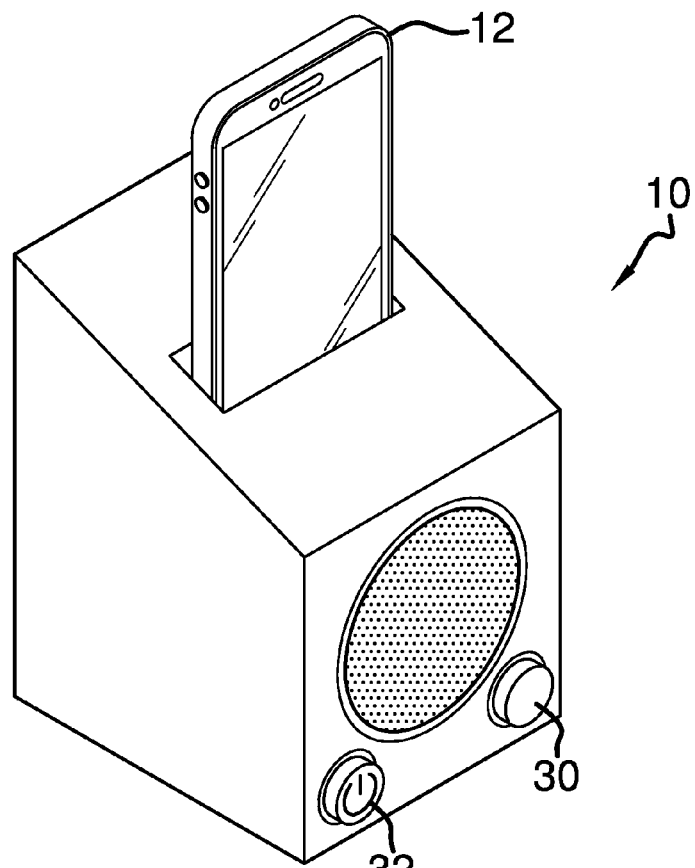
FIG. 1 is a top perspective view of a phone call amplification assembly according to an embodiment of the disclosure.
Figure 2:
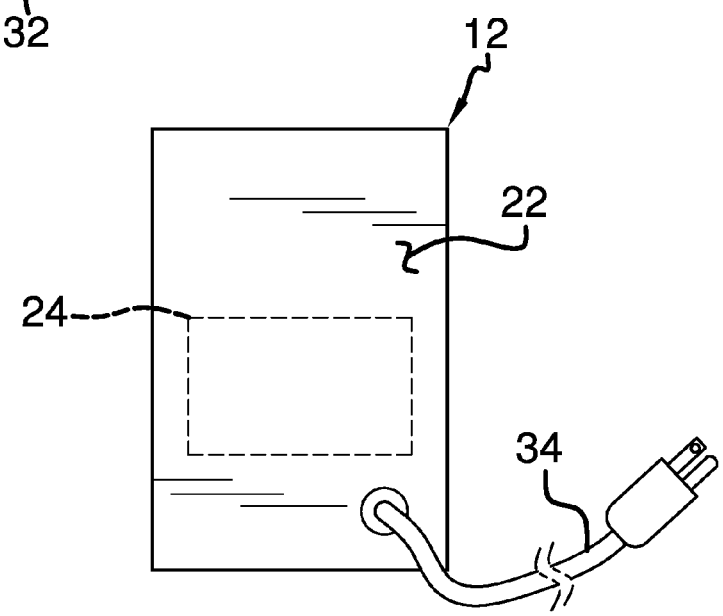
FIG. 2 is a rear view of an embodiment of the disclosure.
Figure 3:
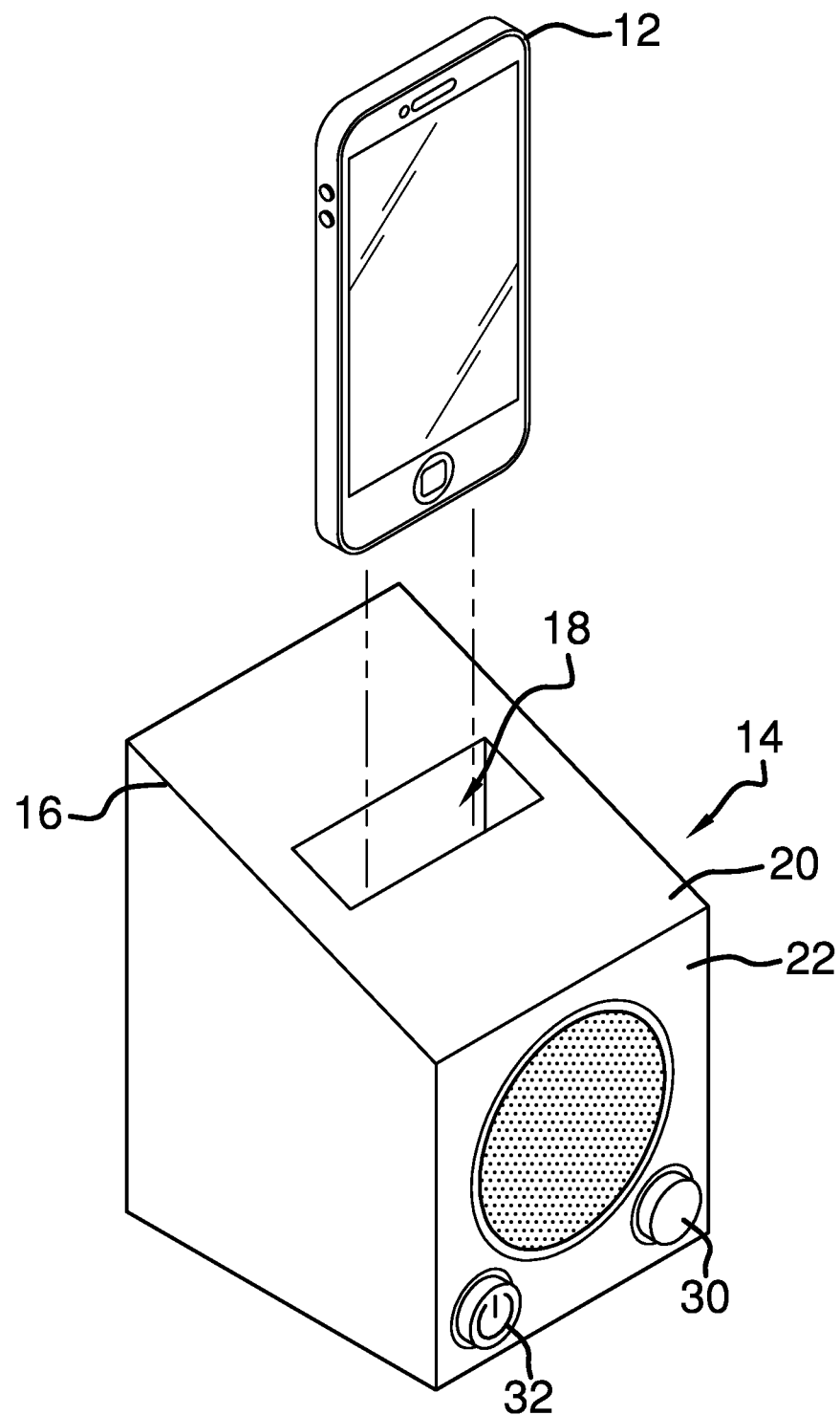
FIG. 3 is a top perspective view of an embodiment of the disclosure.
Figure 4:
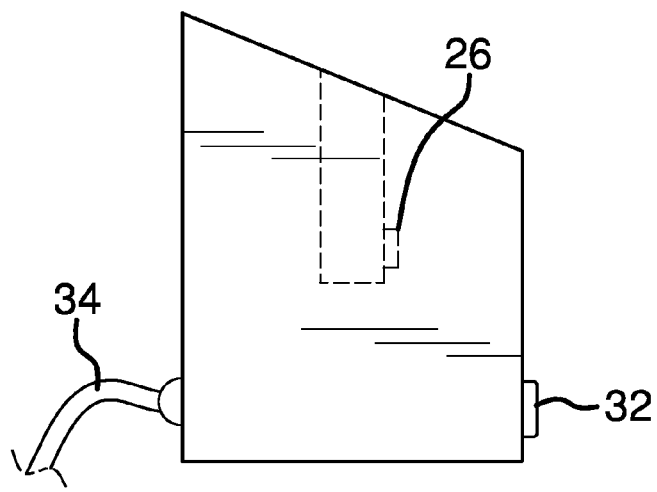
FIG. 4 is a side view of an embodiment of the disclosure.
Figure 5:
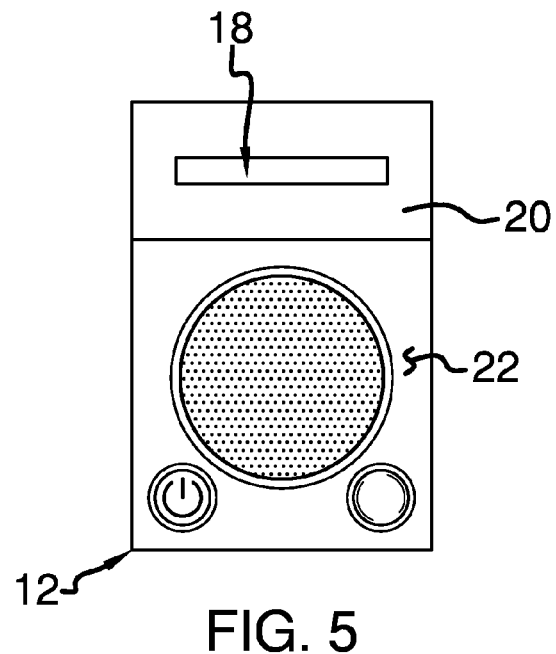
FIG. 5 is a front view of an embodiment of the disclosure.
Figure 6:
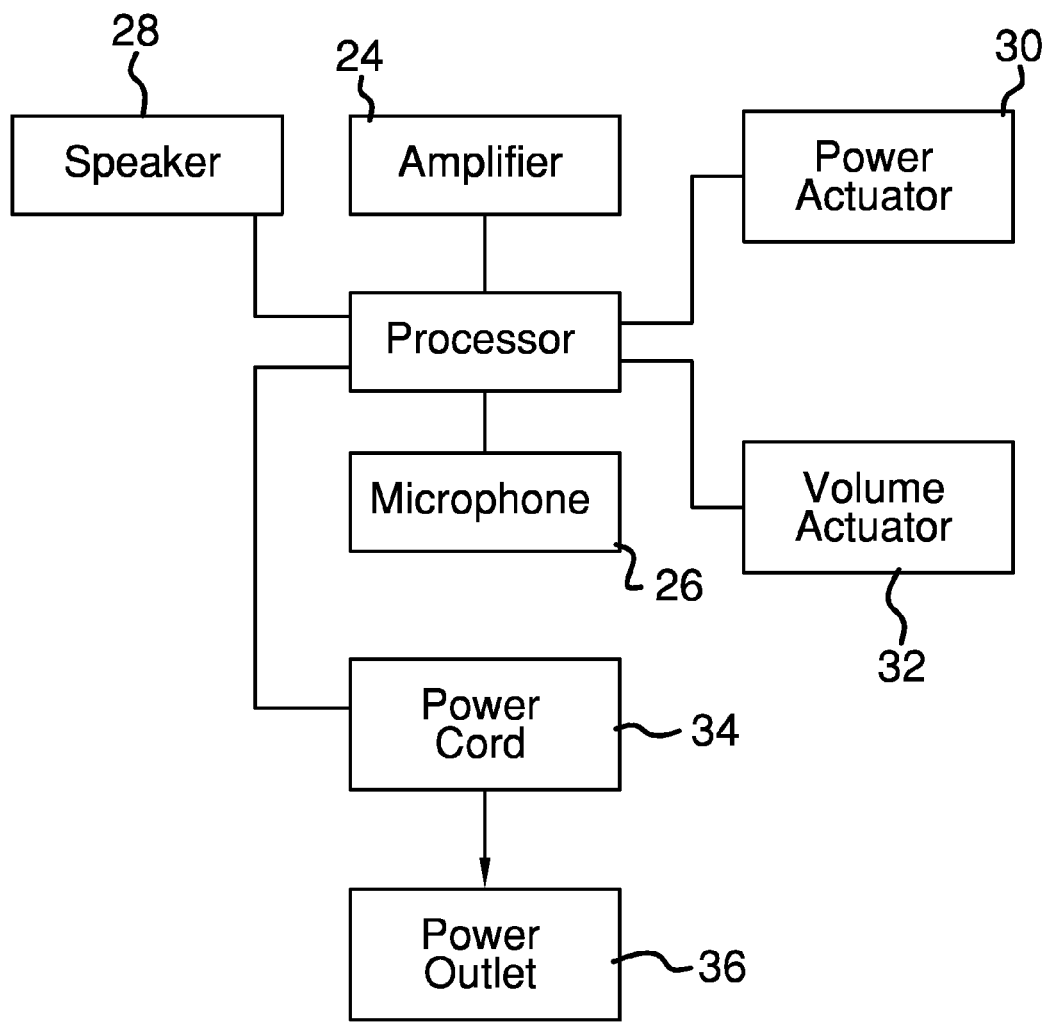
FIG. 6 is a schematic view of an embodiment of the disclosure.

With reference now to the drawings, and in particular to FIGS. 1 through 6 thereof, a new phone call hearing assisting device embodying the principles and concepts of an embodiment of the disclosure and generally designated by the reference numeral 10 will be described.

As best illustrated in FIGS. 1 through 6, the phone call amplification assembly 10 generally comprises a conventional cellular phone 12 including a sound emitter to emit a sound when the cellular phone 12 receives a phone call. The cellular phone 12 may further include a vibrating member such that the cellular phone vibrates when the cellular phone 12 receives the phone call.

A housing 14 has a perimeter wall 16 and the perimeter wall 16 has a well 18 extending therein. The well 18 has a size to receive the cellular phone 12. The well 18 may be vertically oriented. The perimeter wall 16 includes a top wall 20 and a peripheral wall 22 that is attached to and extends downwardly from the top wall 20. The well 18 is positioned in the top wall 20.

An amplifier 24 is mounted in the housing 14. A microphone 26 is mounted in the housing 14 and is electrically coupled to the amplifier 24. The microphone 26 may be positioned within the well 18. The microphone 26 will not only capture audible sounds produced by the cellular phone 12, but will also capture the sound of the cellular phone 12 vibrating against the walls of the well 18. The well 18 may be comprised of a rigid material to increase the sound of the cellular phone vibrating 12 in the well 18 to be captured by the microphone 26. A speaker 28 is mounted in the housing 14 and is electrically coupled to the amplifier 24. The microphone 26 capture audible sounds such that the audible sounds are amplified and emitted by the speaker 28. The speaker 28 in turn is capable of reproducing the audible sounds at a level greater than approximately 80 decibels from a distance of at least 15.0 feet from the speaker 28.

A power actuator 30 is mounted on the housing 14 and is operationally coupled to the amplifier 24. The power actuator 30 is actuated to turn the amplifier 24 on or off. A volume control 32 is mounted on the housing 14 and is operationally coupled to the amplifier 24. The volume control 32 is actuated to alter a volume output of the speaker 28. A power cord 34 is electrically coupled to the amplifier 24 and is pluggable into a conventional outlet 36 to provide electricity to the amplifier 24. However, the assembly 10 may include a battery mounted in the housing 14 and electrically coupled to the amplifier 24.

In use, the housing 14 is placed within a dwelling in a convenient place so that the user, when they enter the dwelling, will place their cellular phone 12 in the well 18. If the cellular phone 12 receives a telephone call, the sounds captures by the microphone 26 will be amplified and emitted by the speaker 28 so that that sound will travel throughout a larger area of the dwelling than would be possible with the sound emitter of the cellular phone 12 alone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone call amplification system comprising:
   a cellular phone including a sound emitter to emit a sound when said cellular phone receives a phone call;
   a housing having a perimeter wall, said perimeter wall having a well extending therein, said well having a size to receive said cellular phone, said well being vertically oriented, said perimeter wall including a top wall and a peripheral wall being attached to and extending downwardly from said top wall, said well being positioned in said top wall;
   an amplifier being mounted in said housing;
   a microphone being mounted in said housing and being electrically coupled to said amplifier, said microphone being positioned within said well; and
   a speaker being mounted in said housing and being electrically coupled to said amplifier, said microphone capturing audible sounds such that the audible sounds are amplified and emitted by said speaker.

2. The phone call amplification system according to claim 1, further including a power actuator being mounted on said housing and being operationally coupled to said amplifier, said power actuator being actuated to turn said amplifier on or off.

3. The phone call amplification system according to claim 1, further including a volume control being mounted on said housing and being operationally coupled to said amplifier, said volume control being actuated to alter a volume output of said speaker.

4. A phone call amplification system comprising:
   a cellular phone including a sound emitter to emit a sound when said cellular phone receives a phone call, said cellular phone including a vibrating member such that said cellular phone vibrates when said cellular phone receives the phone call;
   a housing having a perimeter wall, said perimeter wall having a well extending therein, said well having a size to receive said cellular phone, said well being vertically oriented, said perimeter wall including a top wall and a peripheral wall being attached to and extending downwardly from said top wall, said well being positioned in said top wall;
   an amplifier being mounted in said housing;
   a microphone being mounted in said housing and being electrically coupled to said amplifier, said microphone being positioned within said well;
   a speaker being mounted in said housing and being electrically coupled to said amplifier, said microphone capturing audible sounds such that the audible sounds are amplified and emitted by said speaker, said speaker being capable of reproducing the audible sounds at a level greater than 80 decibels from a distance of at least 15.0 feet from said speaker;
   a power actuator being mounted on said housing and being operationally coupled to said amplifier, said power actuator being actuated to turn said amplifier on or off; and
   a volume control being mounted on said housing and being operationally coupled to said amplifier, said volume control being actuated to alter a volume output of said speaker.

* * * * *